(12) United States Patent
Zhang et al.

(10) Patent No.: US 10,926,938 B2
(45) Date of Patent: Feb. 23, 2021

(54) INSULATING CONTAINER, TRANSPORTATION DEVICE AND TRANSPORTATION METHOD

(71) Applicant: SOLEE (WUHAN) SCIENCE & TECHNOLOGY CO., LTD, Wuhan (CN)

(72) Inventors: Lidong Zhang, Wuhan (CN); Lijun Sun, Wuhan (CN); Jiangcan Wu, Wuhan (CN); Kaihua Tian, Wuhan (CN); Chunhui Han, Wuhan (CN); Yanan Wei, Wuhan (CN)

( * ) Notice: Subject to any disclaimer, the term of this patent is extended or adjusted under 35 U.S.C. 154(b) by 154 days.

(21) Appl. No.: 16/112,639

(22) Filed: Aug. 24, 2018

(65) Prior Publication Data

US 2018/0362243 A1 Dec. 20, 2018

Related U.S. Application Data

(63) Continuation of application No. PCT/CN2016/074481, filed on Feb. 24, 2016.

(51) Int. Cl.
*B65D 81/38* (2006.01)
*B65D 88/12* (2006.01)
(Continued)

(52) U.S. Cl.
CPC ......... *B65D 81/3823* (2013.01); *B65D 19/06* (2013.01); *B65D 88/12* (2013.01);
(Continued)

(58) Field of Classification Search
CPC .. B65D 81/3823; B65D 88/12; B65D 33/048; F25D 23/06
See application file for complete search history.

(56) References Cited

U.S. PATENT DOCUMENTS

| 2,781,643 A * | 2/1957 | Fairweather | F25D 3/00 62/372 |
| 2,988,241 A * | 6/1961 | Morrison | B62D 33/048 220/592.26 |

(Continued)

FOREIGN PATENT DOCUMENTS

| CN | 201268484 Y | 7/2009 |
| CN | 202765607 U | 3/2013 |

(Continued)

OTHER PUBLICATIONS

Internation Search Report of PCT/CN2016/074481, dated Nov. 25, 2016.

*Primary Examiner* — Nelson J Nieves
(74) *Attorney, Agent, or Firm* — Erson IP (Nelson IP)

(57) ABSTRACT

An insulating container comprises a container body and a container cover connected to the container body. The container both and the container cover each comprises a frame and a plate arranged on the frame. The plate comprises, from inside out, an external high strength sheet, an extruded polystyrene sheet, phase-change insulating sheets made of phase-change material, and an internal sheet. A phase-change process of the phase-change insulating sheets cooperates with a refrigeration system of the transportation device to precisely control the temperature of the insulating container and a refrigerator truck to be near a phase-change temperature. In the present disclosure, the phase-change insulating sheets made of the phase-change material remain to be in a solid state before or after occurrence of a phase change, so that the structure of the insulating container does not change with the phase change and a leakage problem of the phase-change material does not exist.

8 Claims, 6 Drawing Sheets

(51) Int. Cl.
    *B65D 19/06*     (2006.01)
    *B65D 88/74*     (2006.01)
    *B62D 33/04*     (2006.01)

(52) U.S. Cl.
    CPC ........... *B65D 88/74* (2013.01); *B65D 88/744* (2013.01); *B62D 33/048* (2013.01); *B65D 2519/00024* (2013.01); *B65D 2519/00029* (2013.01); *B65D 2519/00034* (2013.01); *B65D 2519/00059* (2013.01); *B65D 2519/00064* (2013.01); *B65D 2519/00069* (2013.01); *B65D 2519/00174* (2013.01); *B65D 2519/00184* (2013.01); *B65D 2519/00208* (2013.01); *B65D 2519/00218* (2013.01); *B65D 2519/00233* (2013.01); *B65D 2519/00273* (2013.01); *B65D 2519/00293* (2013.01); *B65D 2519/00323* (2013.01); *B65D 2519/00333* (2013.01); *B65D 2519/00502* (2013.01); *B65D 2519/00532* (2013.01); *B65D 2519/00616* (2013.01); *B65D 2519/00666* (2013.01); *B65D 2519/00716* (2013.01)

(56) References Cited

U.S. PATENT DOCUMENTS

| | | | | |
|---|---|---|---|---|
| 4,531,278 A * | 7/1985 | Boykin | ................ | B62D 33/048 |
| | | | | 220/4.33 |
| 5,570,588 A * | 11/1996 | Lowe | ................ | B65D 81/3818 |
| | | | | 62/457.7 |
| 6,003,719 A * | 12/1999 | Stewart, III | ....... | B65D 81/3825 |
| | | | | 220/592.11 |
| 6,128,914 A * | 10/2000 | Tamaoki | ................ | F25B 9/006 |
| | | | | 312/401 |
| 7,444,830 B2 * | 11/2008 | Moran | ................ | F25D 11/003 |
| | | | | 374/E11.006 |
| 9,718,608 B2 * | 8/2017 | Tattam | ............... | B65D 81/3834 |
| 2005/0006272 A1 | 1/2005 | Derifield | | |
| 2009/0032530 A1 * | 2/2009 | Chu | ..................... | B65D 88/528 |
| | | | | 220/4.28 |
| 2014/0033759 A1 * | 2/2014 | Ide | ..................... | F25D 23/062 |
| | | | | 62/457.2 |
| 2014/0345316 A1 * | 11/2014 | Godbole | ............... | A47F 5/0043 |
| | | | | 62/441 |
| 2014/0353317 A1 * | 12/2014 | Ranade | ............. | B65D 81/3823 |
| | | | | 220/592.01 |
| 2015/0166244 A1 * | 6/2015 | Wood | ..................... | B31B 50/74 |
| | | | | 220/592.25 |
| 2016/0023837 A1 * | 1/2016 | Furneaux | ................. | F25D 3/06 |
| | | | | 220/592.11 |
| 2016/0272405 A1 * | 9/2016 | Furneaux | ............... | B65D 25/38 |
| 2017/0073147 A1 * | 3/2017 | Kuhn | ................ | B65D 81/3825 |
| 2017/0108260 A1 * | 4/2017 | Ansted | .................... | F25D 23/06 |
| 2017/0240337 A1 * | 8/2017 | Austerberry | ........... | B65D 25/30 |
| 2017/0247169 A1 * | 8/2017 | Losco | ................ | B65D 90/06 |
| 2018/0037404 A1 * | 2/2018 | Wang | ................ | B62D 33/046 |
| 2018/0224178 A1 * | 8/2018 | Sun | ........................ | B65D 25/14 |
| 2018/0283761 A1 * | 10/2018 | Buttiker | ................ | A01N 1/0273 |
| 2018/0320947 A1 * | 11/2018 | Jain | ..................... | B65D 81/3825 |
| 2019/0226744 A1 * | 7/2019 | Wood | ..................... | B65B 55/00 |

FOREIGN PATENT DOCUMENTS

| | | |
|---|---|---|
| CN | 202850229 U | 4/2013 |
| CN | 202897236 U | 4/2013 |
| CN | 104503309 A | 4/2015 |
| WO | 2012081581 A1 | 6/2012 |

* cited by examiner

INSULATING CONTAINER, TRANSPORTATION DEVICE AND TRANSPORTATION METHOD

CROSS-REFERENCE TO RELATED APPLICATIONS

This application is a continuation of International Patent Application No. PCT/CN2016/074481 with a filing date of Feb. 24, 2016, designating the United States, now pending. The content of the aforementioned application, including any intervening amendments thereto, is incorporated herein by reference.

TECHNICAL FIELD

The present disclosure relates to the technical field of cold-chain transportation, and particularly to an insulating container, a transportation device and a transportation method.

BACKGROUND OF THE PRESENT INVENTION

Cold-chain transportation means that transported cargoes, are always transported at a certain temperature in the s process of transportation in all links of loading, unloading and handling, changing transportation modes, changing packaging equipment, etc. According to the quantity of the cargoes, the global cold-chain transportation industry mainly adopts the following two methods to transport the cargoes currently.

A small quantity of cargoes is often transported by insulating containers. A proper amount of coolants is placed into the insulating containers so that the temperature in the insulating containers meets temperature requirements for cargo transportation.

A large quantity of cargoes is often transported by a refrigerator truck. The refrigerator truck enables the temperature in a carriage to meet the temperature requirements for cargo transportation through a refrigeration system.

However, when the insulating containers are adopted for transportation, it is difficult to control the temperature and it is easy to generate the phenomenon of local overheating or undercooling. When the refrigerator truck is adopted for transportation, because the refrigerator truck is long, a temperature difference in the refrigerator truck is large. In addition, when the refrigerator truck needs to continuously transport the cargoes towards multiple destinations, repeated operations of opening and closing the door for loading and unloading of the cargoes will have a great impact on the temperature in the refrigerator truck, which will easily lead to uneven distribution of the temperature in the refrigerator truck and partial overcooling or overheating of the cargoes. Even if the insulating containers and the refrigerator truck are used jointly to transport the cargoes, there is a defect that it is difficult to accurately control the temperature.

SUMMARY OF PRESENT INVENTION

In view of the technical problem that the existing cold-chain transportation is difficult to accurately control the temperature, the present disclosure provides an insulating container, a transportation device and a transportation method.

In view of the above technical problem, the present disclosure proposes the following technical solution:

In one aspect, an insulating container is provided, which comprises a container body and a container cover connected to the container body, each of the container body and the container cover comprises a frame and a plate arranged on the frame; and the plate comprises, from inside out, an external high strength sheet, an extruded polystyrene sheet, phase-change insulating sheets made of phase-change material, and an internal sheet.

Preferably, the phase-change insulating sheets are solid state sheets, and the phase-change insulating sheets remain to be solid state sheets after occurrence of a phase change.

Preferably, the plate further comprises a fixing frame; and each of the phase-change insulating sheets is arranged in the fixing frame.

Preferably, the fixing frame further comprises an extending portion which extends outwards; the extruded polystyrene sheet comprises a concave portion adapted to the extending portion; and the extending portion is coupled with the concave portion, so as to connect the extruded polystyrene sheet to the fixing frame.

Preferably, the insulating container further comprises an outer frame arranged outside the container body; and the outer frame is used far fixing the insulating container and increasing strength of the insulating container.

Preferably, the insulating container further comprises a tray arranged on a bottom of the insulating container and configured to facilitate transfer of the insulating container.

Preferably, the outer frame comprises an extending plate arranged on a bottom of the outer frame and extending inwards; and the extending plate is located between the container body and the tray.

Preferably, corresponding installing holes are respectively formed in the insulating container, the extending plate and the tray; and the outer frame, the container body and the tray are connected together with a bolt coupling with the corresponding holes.

Preferably, the outer frame and the frame are made of metal material; and the tray is made of wooden material.

Preferably, the fixing frame is made of wooden material.

Preferably, the insulating container further comprises a sliding rail arranged in the container body and located on a bottom plate of the container body, and a sliding plate arranged on the sliding rail and configured to carry cargoes; and the sliding plate is capable of sliding into or out of the container body through the sliding rail, so as to facilitate loading and unloading of the cargoes.

In another aspect, a transportation device is further provided, which comprises a refrigerator truck, a refrigeration system and the above insulating container; and the insulating container is arranged in the refrigerator truck.

Preferably, the refrigeration system comprises: a temperature detecting unit configured to detect temperatures of the refrigerator truck and the insulating container and transmit the temperature in form of a wireless signal; a signal receiving unit configured to wirelessly receive the wireless signal and transmit the temperatures to GPS unit; the GPS unit connected to the signal receiving unit and configured to transmit the temperatures to a temperature monitoring platform; the temperature monitoring platform configured to monitor and record the temperature and transmit a GPS command to the GPS unit when the temperatures are not within a preset temperature range; a control unit connected to the GPS unit and configured to receive a control signal of the GPS unit and control to turn on and turn off a refrigeration unit; and the refrigeration unit configured to refrigerate under the control of the control unit.

Preferably, the refrigeration system further comprises an alarm unit configured to give an alarm when the temperatures are still not within the preset temperature range after the GPS command is transmitted for a preset time.

In yet another aspect, a transportation method is further provided which is applicable to the above transportation device, comprises the following steps:

S1, placing the insulating container and the cargoes into a refrigerating cabinet with a first preset temperature for precooling before cargoes are transported;

S2, turning on the refrigeration system of the transportation device for precooling the refrigerator truck to a second preset temperature;

S3, loading the cargoes into the precooled insulating container at the first preset temperature and sealing the insulating container;

S4, transferring the insulating container into the refrigerator truck and sealing a truck door; and S5, delivering the cargoes and automatically controlling the refrigeration in a transportation process so that the temperature of the refrigerator truck and the temperature of the insulating container are respectively within respective preset temperature ranges.

The implementation of the embodiments of the present disclosure brings the following beneficial effects: the temperature of the insulating container can be accurately controlled to be near the phase-change temperature through heat absorption and heat release of the phase-change insulating sheets in the phase-change process. Moreover, in the present disclosure, the phase-change insulating sheets made of the phase-change material remain to be in a solid state before or after occurrence of the phase change, so that the structure of the insulating container does not change with the phase change and, a leakage problem of the phase-change material does not exist. In addition, through the adoption of the insulating container in the present disclosure, the transportation method can be greatly simplified, freezing time and cold release time of the coolant before transportation are saved, the work of operators in a low-temperature refrigerating cabinet is avoided and the working environment of the operators is improved.

DESCRIPTION OF THE DRAWINGS

In order to make the technical solutions in the disclosure or in the prior art described more clearly, the drawings associated to the description of the embodiments or the prior art will be illustrated concisely hereinafter. Obviously, the drawings, described below are only some embodiments according to the disclosure. Numerous drawings therein will be apparent to one of ordinary skill in the art based on the drawings described in the disclosure without creative efforts.

DETAILED DESCRIPTION OF PREFERRED EMBODIMENTS

In order to make the objects, technical solution and advantages of the present disclosure more clear, the present disclosure will be further described in detail with reference to the accompanying drawings and embodiments below. It should be understood that embodiments described here are only for explaining the present disclosure and the disclosure, however, should not be constructed as limited to the embodiment as set forth herein.

Embodiment 1

Figure 1:
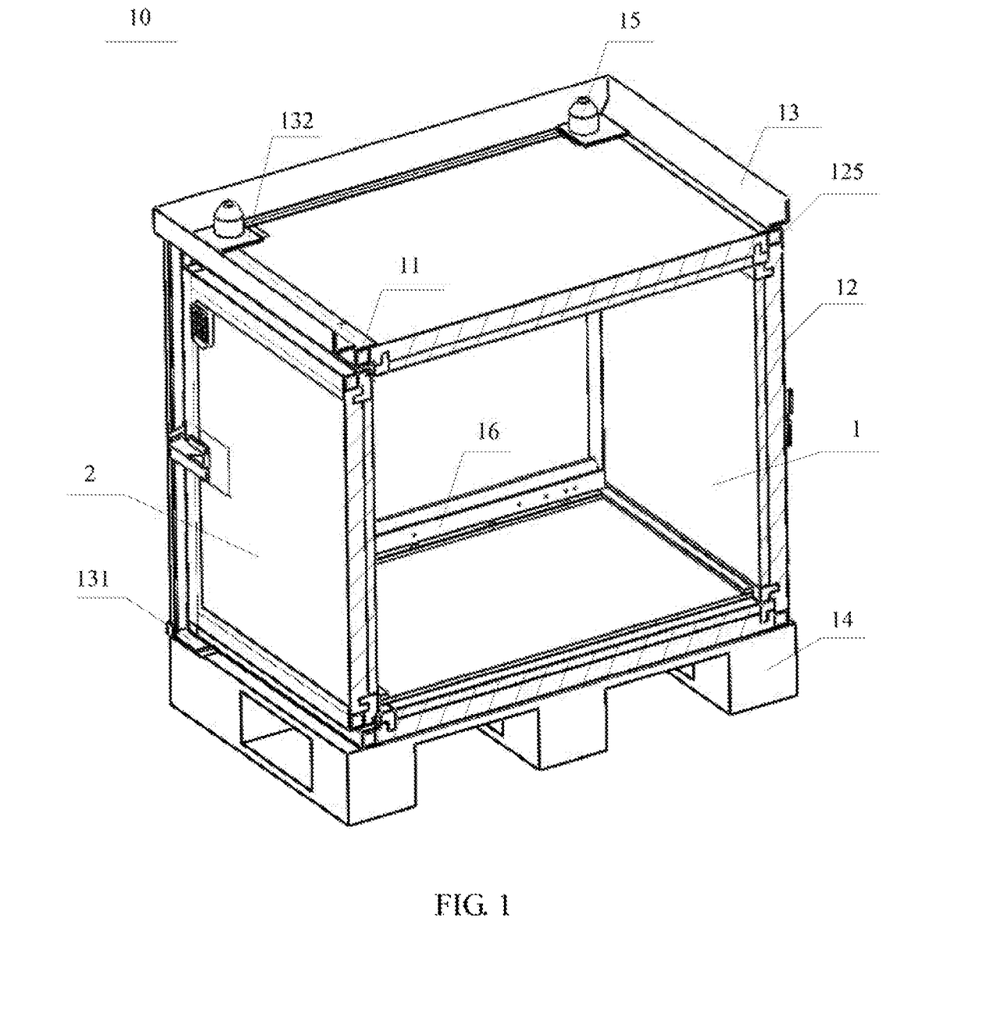
FIG. 1 is a sectional view of a stereoscopic structure of an insulating container according to a first embodiment of the present disclosure.
Figure 2:
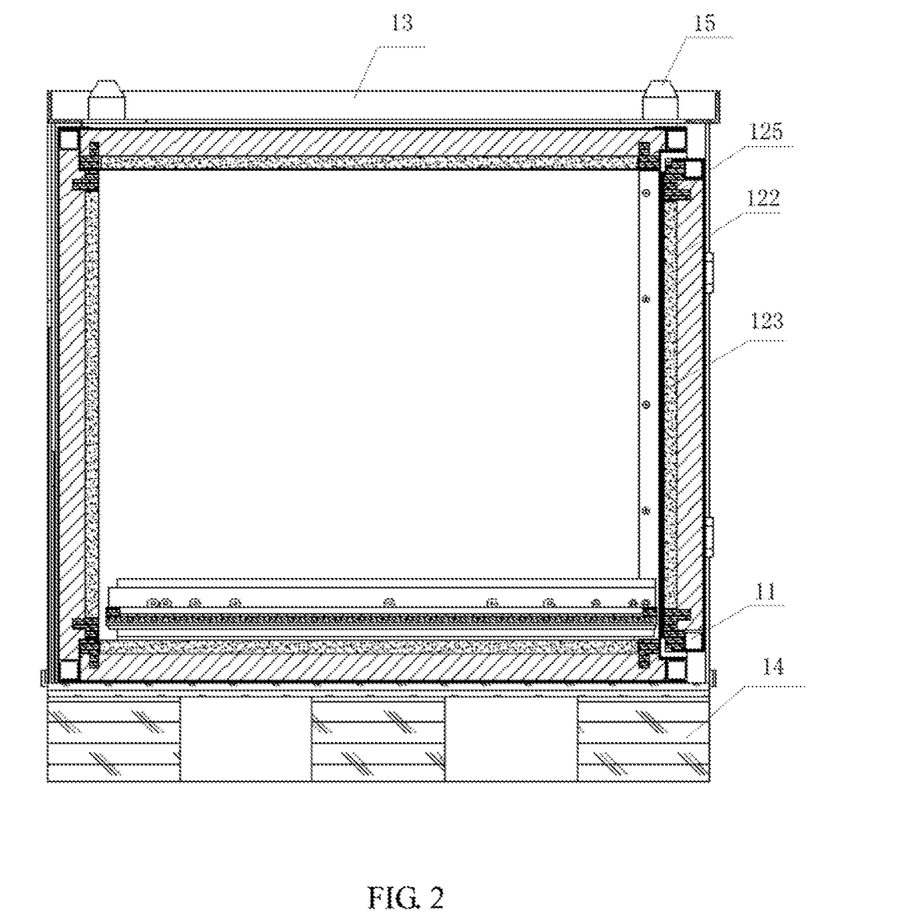
FIG. 2 is a sectional view of the insulating container shown in FIG. 1.
Figure 3:
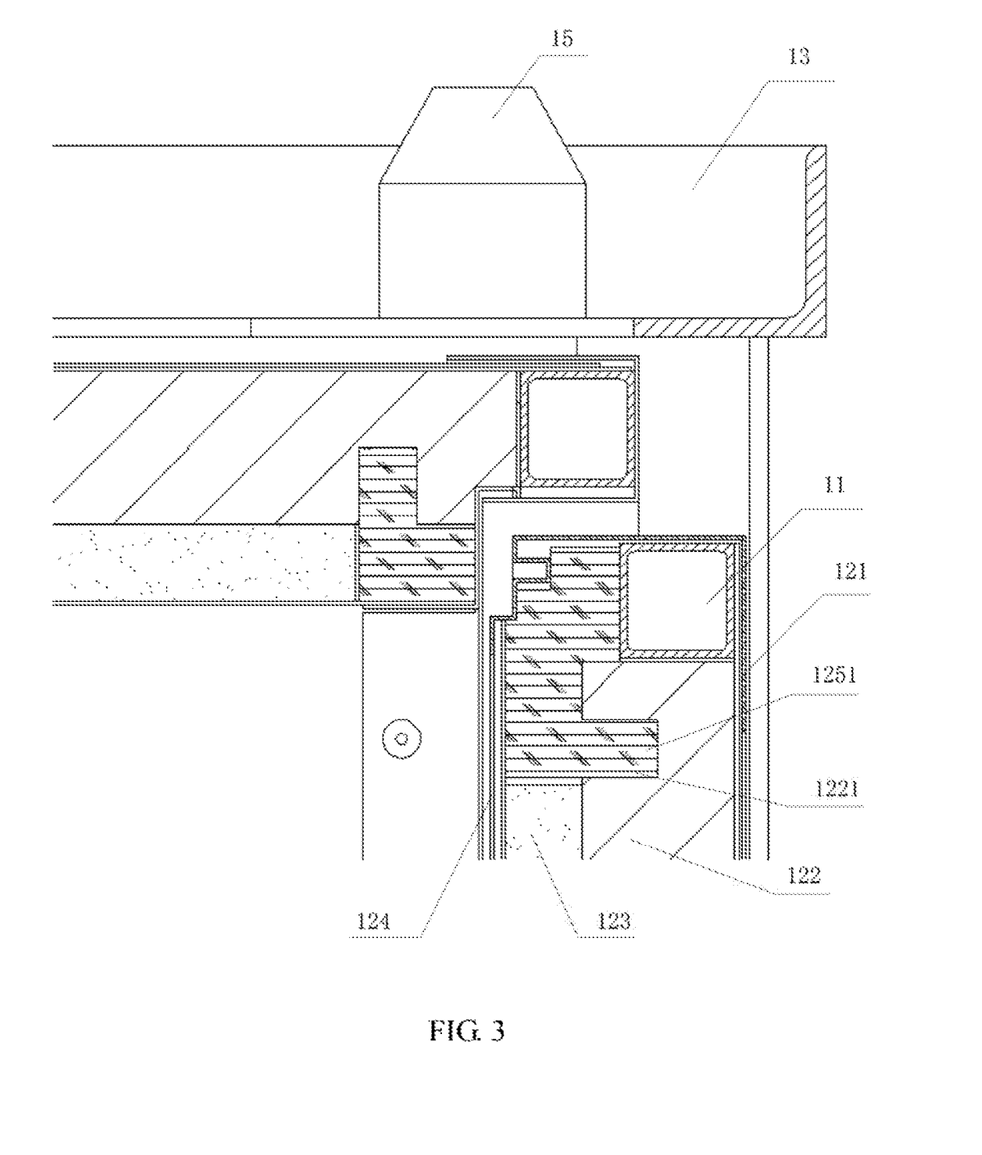
FIG. 3 is a local enlarged diagram of the insulating container shown in FIG. 2.

The present embodiment provides an insulating container. Referring to FIG. 1 to FIG. 3, the insulating container 10 comprises a container body 1 and a container cover 2 connected to the container body 1. Each of the container body 1 and the container cover 2 comprises a frame 11 and plates 12 arranged on the frame 11. The structure of the insulating container 10 may be in any shape, such as cylinder, rectangle or other irregular stereo shape. In the present embodiment, the insulating container 10 is a rectangle. Therefore, in the present embodiment, six plates 12 are arranged, wherein five plates 12 are arranged on the frame 11 of the container body 1 and the other plate 12 is arranged on the frame 11 of the container cover 2. The insulating container 10 for accommodating cargoes is encircled by the six plates 12 and the frame 11 jointly. As shown in FIG. 2, each of the plates 12 comprises, from inside out, an external high strength sheet 121, an extruded polystyrene sheet 122, phase-change insulating sheets 123 made of phase-change material, and an internal sheet 124.

In the present embodiment, the external high strength sheet 121 of the insulating container 10 is configured to fix the shape of the insulating container 10 and allow the insulating container 10 to have high strength, so that the insulating container 10 is resistant to pressure and impact. The extruded polystyrene sheet 122 is used for heat insulation and can slow the heat exchange between the insulating container 10 and the external environment. The phase-change, materials have preset phase-change temperatures. Therefore, when the temperature of the environment is higher than the phase-change temperatures of the phase-change insulating sheets 123, the phase-change insulating sheets 123 absorb heat; and when the temperature of the environment is lower than the phase-change temperatures of the phase-change insulating sheets 123, the phase-change insulating sheets 123 release the heat. Generally, the phase-change temperatures of the phase-change insulating sheets are changed by selecting different phase-change materials. Because the internal sheet 124 is located in the innermost part of the insulating container, the internal sheet 124 is mainly configured to insulate the heat and beautify an inner surface environment of the insulating container.

A traditional insulating container usually has only one layer of ordinary insulating sheet, i.e., the extruded polystyrene sheet, and has no phase-change insulating sheet. During use, to ensure that the insulating container is at a low temperature, a coolant is often placed in the insulating container. Before each transportation, the use amount of the coolant shall be calculated according to transportation time, the temperature of the outside environment and the quantity of the cargoes, and then the coolant is frozen, releases cold and is packed, consuming a lot of manpower and time. When the traditional insulating container insulates heat using the coolant, the freezing temperature of the coolant is much lower than the refrigeration temperature of the cargoes and it is difficult to control the cold release effect of the coolant, so it is easy to generate an overcooling phenomenon during use. However, after the heat is insulated for a period of time, the temperature of the coolant increases and exceeds the refrigeration temperature of the cargoes; and then a local high temperature phenomenon occurs. To avoid overcooling and overheating, it is, necessary to require packing staff to achieve a certain level of operation methods for the insulating container and the supporting coolant. Therefore, requirements for the staff are higher.

When the insulating container 10 of the present disclosure is used, because the phase-change insulating sheets are made into part of the structure of the insulating container 10, the cargoes only need to be loaded into the insulating container. The operation is simple; no special requirement is posed for the staff; a lot of manpower and materials are saved; and a lot of time for freezing, cold release and packing for the coolant is also saved (in the prior art, before the insulating container is packed, the coolant needs to be frozen in the low-temperature refrigerating cabinet for more than 12 hours, and needs to release cold in the refrigerating cabinet for 8 hours; and the cargoes and the insulating container need to be placed in the refrigerating cabinet in advance for precooling). Meanwhile, an overcooling or overheating problem that may occur during transportation is solved; direct contact between the coolant and the cargoes is avoided; a pollution problem for the cargoes when the package of the coolant is broken is avoided; and the cargoes are safer.

In addition, in the present disclosure, the phase-change materials are made into the phase-change insulating sheets, so that the heat is absorbed or released through the phase change and the phase-change insulating sheets can be matched with the internal sheet, thereby reducing strength requirements for the internal sheet. In this way, the internal sheet can be even made into a layer of film, and the material selection range of the internal sheet is also larger. The phase-change insulating sheets can also be matched with the extruded polystyrene sheet, to play a role of mutual enhancement on the insulating effect. Because the phase-change process of the phase-change insulating sheets is a continuous process, not a sudden change process, the temperature of one side of the extruded polystyrene sheet close to the phase-change insulating sheets is basically kept at the phase-change temperature in the entire phase-change process of the phase-change insulating sheets, while the temperature of one side of the extruded polystyrene sheet away from the phase-change insulating sheets is the temperature of the environment. In this case, the function of the extruded polystyrene sheet for reducing heat transfer is enhanced.

Specifically, the phase-change insulating sheets 123 are solid state sheets, and the phase-change insulating sheets 123 remain to be solid state sheets after occurrence of the phase change. In the present embodiment, after the phase-change insulating sheets 123 are made into the solid state sheets, the phase-change insulating sheets remain to be in a solid state before or after occurrence of the phase change, so that the structure of the insulating container does not change with the heat absorption and heat release of the phase-change insulating sheets and a leakage problem of the phase-change materials is also effectively avoided. In the prior art, the phase-change materials are often organic materials, while these organic materials are often toxic, polluting or hazardous chemicals. How to avoid the leakage of the phase-change materials in the insulating container is always a technical problem in this field. To overcome the technical problem, it usually takes a lot of manpower and money to prepare a sealed container to prevent the phase-change materials from leaking out. However, in the present disclosure, the phase-change insulating sheets 123 are always in a solid state and have no leakage problem of the phase-change materials at all.

Figure 4:
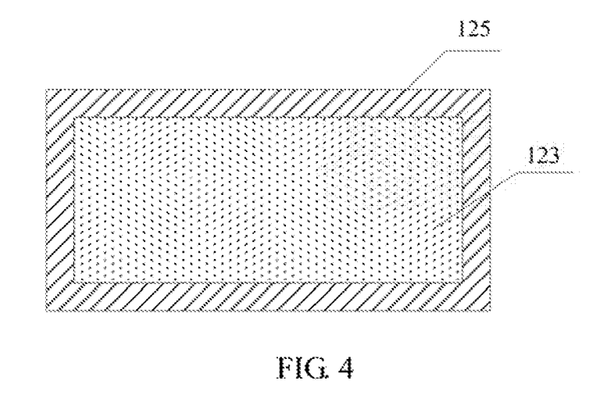
FIG. 4 is a structural schematic diagram of a phase-change insulating sheet of the insulating container shown in FIG. 1.

Further, as shown in FIG. 4, each plate 12 further comprises a fixing frame 125; each of the phase-change insulating sheets 123 is respectively fixed into the fixing frame 125; and then the fixing frame 125 is fixed into the frame 11. Preferably, the fixing frame 125 is made of wooden material. Of course, the fixing frame can also be made of any other proper material, such as plastic, metal or composite material. In the present embodiment, the wooden fixing frame 125 is selected because the wooden material is light and has certain elasticity. A wooden fixing frame 125 is arranged outside the phase-change insulating sheets 123 so that the phase-change insulating sheets 123 directly contact the frame 11. Because the frame 11 is often made of hard material, the fixing frame 125 arranged between the phase-change insulating sheets 123 and the frame 11 can provide certain buffer for the phase-change insulating sheets 123, so as to prevent the frame 11 from damaging the phase-change insulating sheets 123 and avoid increasing too much weight on the insulating container.

Further, as shown in FIG. 3, the fixing frame 125 further comprises an extending portion 1251 which extends outwards; the extruded polystyrene sheet 122 comprises a concave portion 1221 adapted to the extending portion 1251; and the extending portion 1251 is coupled with the concave portion 1221 so as to connect the extruded polystyrene sheet 122 to the fixing frame 125.

It should be noted that "internal" and "external" are described with respective to the insulating container in the present disclosure. The direction approaching to the internal accommodating space of the insulating container is defined as inward, and on the contrary, the direction away from the internal accommodating space of the insulating container is defined as outward.

Figure 5:
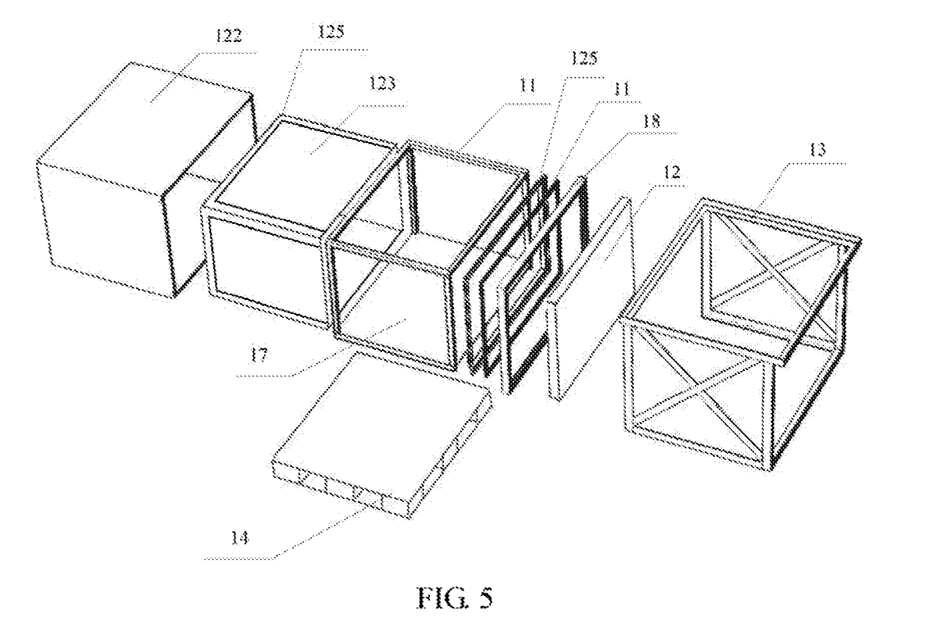
FIG. 5 is a structural exploded view of the insulating container shown in FIG. 1.

Further, as shown in FIG. 1 and FIG. 5, the insulating container 10 further comprises an outer frame 13 arranged outside the container body 1; and the outer frame 13 is used for fixing the insulating container and increasing strength of the insulating container.

Further, as shown in FIG. 1 and FIG. 5, the insulating container 10 further comprises a tray 14 arranged on a bottom of the insulating container and configured to facilitate transfer of the insulating container 10. Preferably, the tray 14 can be made of wooden material because the wooden material has good strength, elasticity and medium mass. Of course, the tray 14 can also be made of any other proper material, such as plastic, metal or composite material.

Specifically, the outer frame 13 comprises an extending plate 131 located on a bottom of the outer frame 13 and extending inwards; and the extending plate 131 is located between the insulating container 10 and the tray 14. Preferably, corresponding installing holes are respectively formed in the container body 1, the extending plate 131 and the tray 14; and the installing holes cooperate with bolts to connect the outer frame 13, the container body 1 and the tray 14 together. The installing holes may be through holes or threaded holes. Of course, the outer frame 13, the container body 1 and the tray 14 can also be connected together through any proper manner, such as welding, riveting or locking. Preferably, as shown in FIG. 1, an extending plate 132 is also arranged on the top of the outer frame 13; installing holes are formed at the tops of the extending plate 132 and the container body 1; and the installing holes cooperate with the bolts 15 to connect the outer frame 13 with the container body 1 together. The installing holes may be through boles or threaded holes. By means of this connection mode, the container body 1, the outer frame 13 and the tray 14 are effectively connected so that the insulating container has high strength and is difficult to damage during transportation. The tray 14 can be configured to facilitate the handling of the insulating container through mechanical tools such as forklifts.

Preferably, the outer frame 13 and the frame 11 can be made of metal material, such as steel, aluminum alloy, copper, etc., so as to ensure that the insulating container has high strength.

Further, as shown in FIG. 1 and FIG. 5, the insulating container 10 further comprises a sliding rail 16 arranged in the container body 1 and located on a bottom plate of the container body 1, and a sliding plate 17 arranged on the sliding rail 16 and configured to carry cargoes. The sliding plate 17 is capable of sliding into or out of the container body 1 through the sliding rail 16, so as to facilitate loading and unloading of the cargoes.

Preferably, as shown in FIG. 5, the container cover 2 of the insulating container 10 is also provided with an edge covering 18; and the edge covering 18 is wrapped at the periphery of the frame 11 for improving aesthetic feeling and hand feeling of the container cover 2.

Embodiment 2

Figure 6:
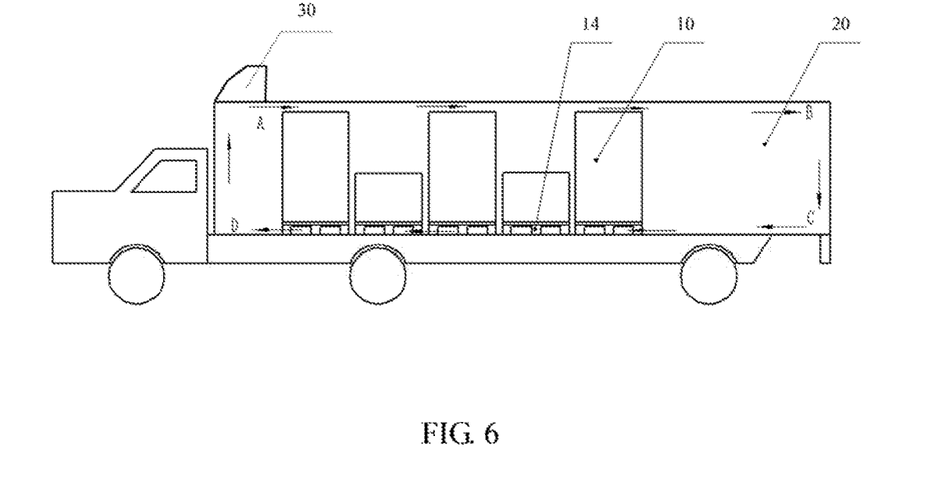
FIG. 6 shows a structure of a transportation device according to a second embodiment of the present disclosure.

The present embodiment provides a transportation device. As shown in FIG. 6, the transportation device comprises a refrigerator truck 20, a refrigeration system 30 and the insulation container 10 described in the above embodiment 1.

In the present embodiment, it is assumed that the transportation temperature range of the cargoes is T1 to T2, wherein T1 is smaller than T2. Before transportation, the refrigerator truck is started to be precooled, and a precooling temperature is T3. When the temperature (in the insulating container) is higher than the phase-change temperature T4 of the phase-change material, the refrigeration system 30 is started to provide cold for the refrigerator truck, thereby reducing the temperature in the refrigerator truck. When the temperature (in the insulating container) is lower than the phase-change temperature T4 of the phase-change material, the refrigeration system 30 is closed, thereby slowly increasing the temperature in the refrigerator truck 20. Generally, T3 is smaller than T1. The phase-change temperature T4 of the phase-change insulating sheets 123 of the insulating container 10 is within the range of T1 to T2 by selecting proper phase-change materials. During transportation, because the temperature T3 in the refrigerator truck 20 is smaller than the temperature T4, heat stored by the phase-change insulating sheets 123 of the insulating container 10 is slowly released into the refrigerator truck 20 through layers of structures, i.e., the phase-change insulating sheets 123 may continuously absorb a large quantity of cold in the refrigerator truck 20 and the temperature is kept at the phase-change temperature T4 for a long time. When the phase-change insulating sheets 123 absorb enough cold and generate the phase change, the temperature in the insulating container 10 starts to decrease and is lower than the phase-change temperature T4. At this moment, the refrigeration system 30 in the refrigerator truck 20 is closed, and the temperature in the refrigerator truck 20 starts to increase. When the temperature in the insulating container 10 is increased to the phase-change temperature T4, the phase-change insulating sheets 123 of the insulating container 10 start to absorb the heat of the refrigerator truck, which is equivalent to release the cold, so that the temperature in the insulating container 10 is kept at the phase-change temperature T4 until the phase change is completed. When the temperature in the insulating container 10 begins to be higher than the phase-change temperature T4, the refrigeration system 30 is started to provide cold air for the refrigerator truck 20 so as to decrease the temperature of the refrigerator truck 20 and the temperature of the insulating container 10. A circulating path of the cold air in the refrigerator truck 20 is roughly shown in FIG. 1 by arrows, i.e., A=B→C→D→A. It should be understood that the duration for the phase change of the phase-change insulating sheets 123 is determined by materials, structures and dimensions of the phase-change insulating sheets 123. Those skilled in the art can correspondingly change the materials, the structures or the dimensions of the phase-change insulating sheets according to the actually required phase-change duration.

Through the above cycle, the temperature of the insulating container 10 can be, accurately controlled to be, within the range of T4±ΔT, wherein the value of the temperature variation ΔT may be any value of 0-3° C., such as 0° C., 0.1° C., 0.5° C., 1° C., 1.5° C., 2° C., 2.5° C. or 3° C. For example, if the transportation temperature range of the cargoes is 2° C.-8° C., then the phase-change temperature T4 of the phase-change insulating sheets 123 is 5° C. by selecting proper phase-change materials, so that the transportation temperature of the cargoes is fully within the range of 2° C.-8° C. However, at this moment, the precooling temperature T3 of the refrigerator truck may be 0° C. Of course, transportation temperature needs of the cargoes are different, so the phase-change temperatures of the selected phase-change insulating sheets 123 are also different and the precooling temperatures of the selected refrigerator trucks 20 are also different. However, unchangeably, through the transportation device of the present disclosure, the transportation temperature can be accurately controlled to be within a small range that roughly centers on the phase-change temperature and the value of the temperature variation ΔT is within the range of 0-3° C.

Figure 7:
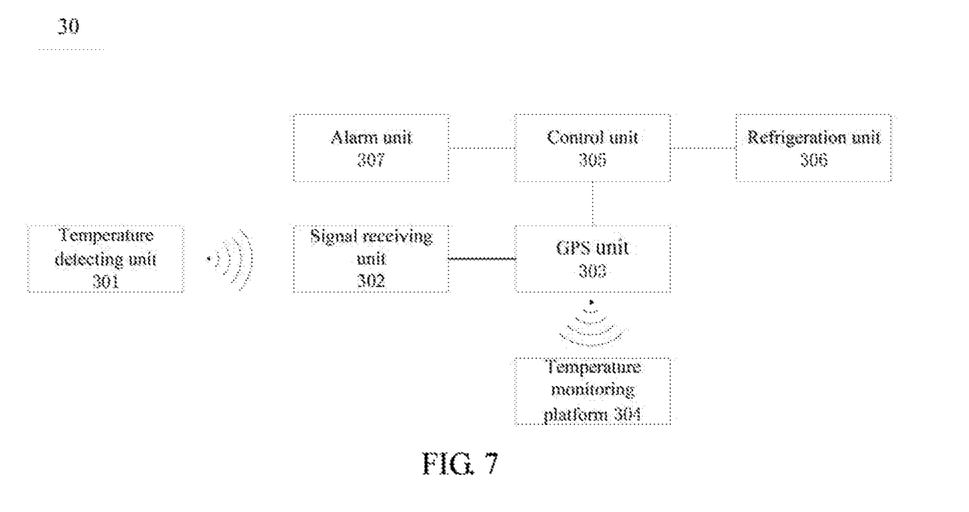
FIG. 7 is a structural block diagram of a refrigeration system of the transportation device shown in FIG. 6.

Specifically, as shown in FIG. 7, the refrigeration system 30 comprises:

a temperature detecting unit 301 configured to detect the temperature of the insulating container 10 and transmit the temperature in form of a wireless signal;

a signal receiving unit 302 configured to wirelessly receive the wireless signal and transmit the temperatures to a GPS unit 303;

the GPS unit 303 connected to the signal receiving unit 302 and configured to transmit the temperatures to a temperature monitoring platform 304;

the temperature monitoring platform 304 configured to monitor and record the temperature and transmit a GPS command to the GPS unit 303 when the temperatures are not within a preset temperature range;

a control unit 305 connected to the GPS unit 303 and configured to receive a control signal of the GPS unit 303 and control to turn on and turn off a refrigeration unit 306; and the refrigeration unit 306 configured to refrigerate under the control of the control unit 305.

In the present embodiment, the temperature monitoring platform 304 is often arranged in a company, while the GPS unit 303 is arranged on the transportation device. The temperature of the transportation device can be remotely monitored, recorded and controlled through data communication between the GPS unit 303 and the temperature monitoring platform 304, so as to ensure that the transportation device is in a normal operation state.

Further, as shown in FIG. 7, the refrigeration system 30 further comprises:

an alarm unit 307 connected to the control unit 305 and configured to give an alarm when the temperatures are still not within the preset temperature range after the GPS command is transmitted for a preset time. Generally, the alarm includes sound and/or light alarm, so, as to remind a driver to enter an emergency procedure. The emergency procedure includes; (1) a temperature control system is checked for failure, and if the temperature control system does not fail, manual operation is conducted; (2) if the temperature control system fails, the driver contacts the temperature monitoring platform in time and arranges other tucks to hand over the cargoes; and (3) the failure truck goes to a designated site for examination and maintenance. Through the present embodiment, the failure of the transportation device can be discovered and treated in time and effective failure treatment measures can be provided to ensure safe transportation of the cargoes.

Embodiment 3

Figure 8:
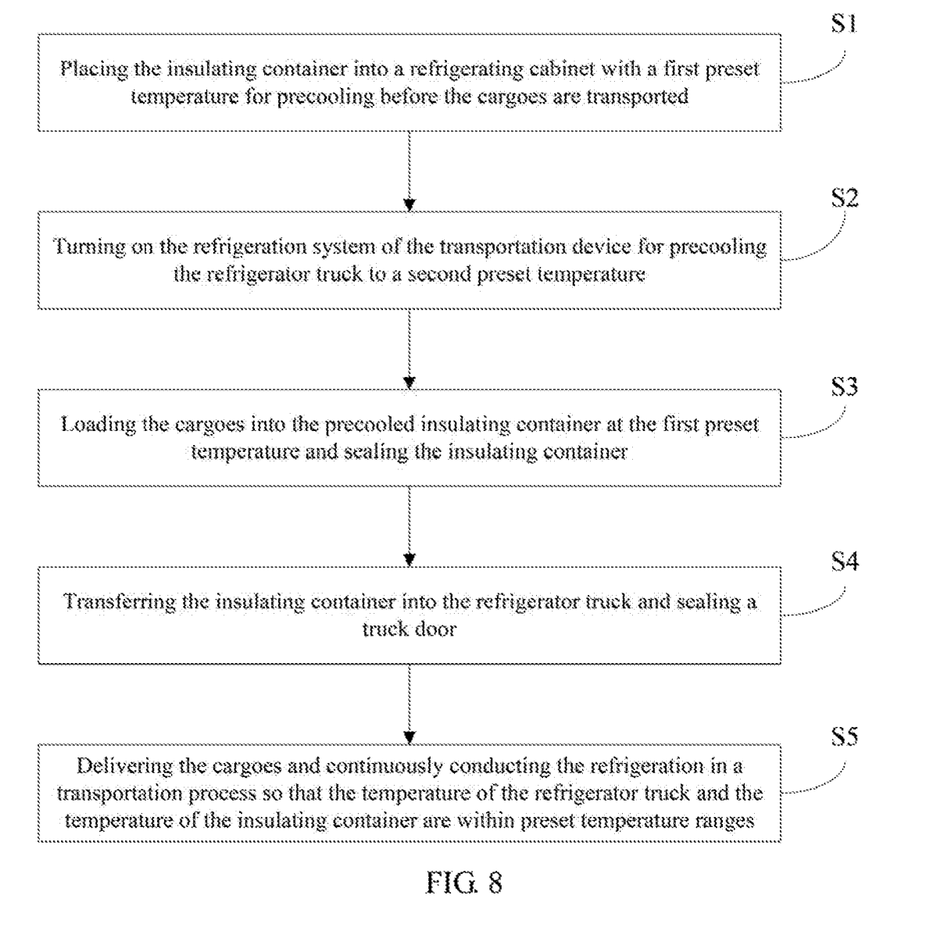
FIG. 8 is a flow chart of a transportation method according to a third embodiment of the present disclosure.

The present embodiment provides a transportation method. The method is suitable for the transportation device described in the above embodiment 2. As shown in FIG. 8, the method comprises the following steps:

S1, placing the insulating container 10 into a refrigerating cabinet with a first preset temperature for precooling before cargoes are transported;

S2, turning on the refrigeration system 30 of the transportation device for precooling the refrigerator truck 20 to a second preset temperature;

S3, loading the cargoes into the precooled insulating container 10 at the first preset temperature and sealing the insulating container;

S4, transferring the insulating container 10 into the refrigerator truck 20 and sealing a truck door; and S5, delivering the cargoes and continuously conducting the refrigeration in a transportation process so that the temperature of the refrigerator truck 20 and the temperature of the insulating container 10 are within preset temperature ranges.

Generally, the first preset temperature is higher than the second preset temperature, and the first preset temperature is within the temperature range required for transportation of the cargoes. For example, if the temperature range required for transportation of the cargoes is 2° C.-8° C., then the first preset temperature can be selected from any temperature within the range of 2° C.-8° C. and the second preset temperature may be 0° C. In this way, as illustrated by the above embodiment 2, through the transportation method of the present disclosure, not only the temperature of the refrigerator truck and the temperature of the insulating container can be accurately controlled, but also the precooling temperature of the insulating container can be increased. In the prior art, the coolant generally needs to be placed in the refrigerating cabinet which is lower than the temperature required for the transportation of the cargoes and frozen for a long time, and needs to release cold at the transportation temperature of the cargoes for more than 8 hours. Moreover, the cargoes must be loaded into the precooled insulating container at the transportation temperature of the cargoes. Therefore, in the prior art, operators must operate at an environment with very low temperature, resulting in that the health of employees is easy to be harmed and increasing the cost of an enterprise. However, in the present disclosure, it is not necessary to freeze the coolant at very low temperature. Therefore, the low-temperature refrigerating cabinet can be started less or even not started, thereby saving energy, saving freezing time and cold release time of the coolant, improving the working environment of the operators, increasing loading efficiency and reducing operation cost.

It should be understood that the terms "first" and "second" in the present disclosure are not used for indicating a sequence number and not used for indicating a time order relation, and are only used for distinguishing the same terms.

The above only discloses preferred embodiments of the present disclosure and is not intended to limit a protection scope of the present disclosure. Those of ordinary skill in the art can understand that, all or some processes for realizing the above embodiments and equal changes made in accordance with claims of the present invention shall still belong to the protection scope of the present invention.

What is claimed:

1. An insulating container, comprising a container body and a container cover connected to the container body; wherein each of the container body and the container cover comprises a frame and a plate arranged on the frame; and the plate comprises, from inside out, an external sheet, an extruded polystyrene sheet, phase-change insulating sheets made of phase-change material, and an internal sheet;
    wherein the insulating container further comprises an outer frame arranged outside the container body and a tray arranged on a bottom of the insulating container and configured to facilitate transfer of the insulating container; the outer frame comprises an extending plate arranged on a bottom of the outer frame and extending inwards; and the extending plate is located between the container body and the tray.

2. The insulating container of claim 1, wherein the phase-change insulating sheets are solid state sheets, and the phase-change insulating sheets remain to be solid state sheets after occurrence of a phase change.

3. The insulating container of claim 1, wherein the plate further comprises a fixing frame; and each of the phase-change insulating sheets is arranged in the fixing frame.

4. The insulating container of claim 3, wherein the fixing frame further comprises an extending portion which extends outwards; the extruded polystyrene sheet comprises a concave portion adapted to the extending portion; and the extending portion is coupled with the concave portion so as to connect the extruded polystyrene sheet to the fixing frame.

5. The insulating container of claim 1, wherein corresponding installing holes are respectively formed in the insulating container, the extending plate and the tray; and the outer frame, the container body and the tray are connected together with a bolt coupling with the corresponding holes.

6. The insulating container of claim 5, wherein the outer frame and the frame are made of metal material; and the tray is made of wooden material.

7. The insulating container of claim 3, wherein the fixing frame is made of wooden material.

8. The insulating container of claim 1, wherein the insulating container further comprises a sliding rail arranged in the container body and located on a bottom plate of the container body, and a sliding plate arranged on the sliding rail and configured to carry cargoes; and the sliding plate is capable of sliding into or out of the container body through the sliding rail, so as to facilitate loading and unloading of the cargoes.

* * * * *